(12) United States Patent
Nagura et al.

(10) Patent No.: US 8,752,661 B2
(45) Date of Patent: Jun. 17, 2014

(54) SADDLE SEAT TYPE VEHICLE

(75) Inventors: Hidenori Nagura, Wako (JP); Kaori Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 13/358,535

(22) Filed: Jan. 26, 2012

(65) Prior Publication Data
US 2012/0193164 A1 Aug. 2, 2012

(30) Foreign Application Priority Data
Jan. 31, 2011 (JP) .................................. 2011-018689

(51) Int. Cl.
*B60K 15/07* (2006.01)

(52) U.S. Cl.
CPC ...................................... *B60K 15/07* (2013.01)
USPC ......................................... 180/69.4; 180/219

(58) Field of Classification Search
CPC ....... B60K 15/00; B60K 15/073; F02M 33/02
USPC ........ 280/830, 833, 835; 180/69.4, 69.5, 314, 180/218, 219, 225, 68.3; 123/518, 519, 520
See application file for complete search history.

(56) References Cited

U.S. PATENT DOCUMENTS

| | | | | |
|---|---|---|---|---|
| 5,868,428 A * | 2/1999 | Ishikawa | ........................ | 280/834 |
| 6,513,613 B2 * | 2/2003 | Suzuki et al. | .................. | 180/227 |
| 6,547,024 B2 * | 4/2003 | Ohyama et al. | ............... | 180/227 |
| 7,472,694 B2 * | 1/2009 | King | ............................... | 123/518 |
| 8,113,312 B2 * | 2/2012 | Seki et al. | ...................... | 180/225 |
| 8,118,128 B2 * | 2/2012 | Shimura et al. | ................ | 180/219 |
| 8,141,672 B2 * | 3/2012 | Kuramochi et al. | .......... | 180/69.4 |
| 8,215,677 B2 * | 7/2012 | Hosoya et al. | ................. | 280/835 |
| 8,256,557 B2 * | 9/2012 | Suzuki | ........................... | 180/219 |
| 8,276,702 B2 * | 10/2012 | Inaoka | ........................... | 180/219 |
| 8,276,944 B2 * | 10/2012 | Inaoka | ........................... | 280/835 |
| 8,316,979 B2 * | 11/2012 | Seki | ............................... | 180/219 |
| 8,327,964 B2 * | 12/2012 | Inaoka et al. | ................... | 180/219 |
| 8,387,736 B2 * | 3/2013 | Ishii et al. | ...................... | 180/219 |
| 8,439,146 B2 * | 5/2013 | Tanaka | .......................... | 180/219 |
| 8,448,734 B2 * | 5/2013 | Maeda et al. | ................. | 180/69.4 |
| 2003/0132837 A1 * | 7/2003 | Hasegawa et al. | ............. | 340/440 |
| 2008/0169148 A1 * | 7/2008 | Beiber Hoeve et al. | ....... | 180/219 |
| 2009/0085342 A1 * | 4/2009 | Chino et al. | ................... | 280/833 |

(Continued)

FOREIGN PATENT DOCUMENTS

JP 2010-229839 A 10/2010

*Primary Examiner* — Hau Phan
*Assistant Examiner* — Jacob Meyer
(74) *Attorney, Agent, or Firm* — Birch, Stewart, Kolasch & Birch, LLP

(57) ABSTRACT

A technique for suppressing the stay of liquefied fuel in a purge pipe in a saddle seat type vehicle having a canister for adsorbing fuel gas. A motorcycle includes a center tunnel above which a foot passage space for allowing the passage of an operator's foot in riding the vehicle is formed and a fuel tank located inside the center tunnel on the front side of an engine. The center tunnel is provided so that a lowermost point of the foot passage space is higher in level than a connection point where a purge pipe is connected to an intake pipe, and the center tunnel has an inclined portion inclined upward from the lowermost point toward the front end of the vehicle. A purge control valve is located at a position on the front side of the lowermost point and higher in level than a canister.

20 Claims, 8 Drawing Sheets

(56) References Cited

U.S. PATENT DOCUMENTS

| | | | |
|---|---|---|---|
| 2010/0078241 A1* | 4/2010 | Maeda et al. | 180/68.3 |
| 2010/0243353 A1* | 9/2010 | Inaoka et al. | 180/68.3 |
| 2010/0243354 A1* | 9/2010 | Inaoka | 180/69.4 |
| 2010/0243355 A1* | 9/2010 | Hosoya et al. | 180/69.4 |
| 2010/0243360 A1* | 9/2010 | Inaoka | 180/225 |
| 2011/0024214 A1* | 2/2011 | Seki et al. | 180/69.4 |

* cited by examiner

SADDLE SEAT TYPE VEHICLE

CROSS-REFERENCE TO RELATED APPLICATIONS

The present application claims priority under 35 USC 119 to Japanese Patent Application No. 2011-018689 filed on Jan. 31, 2011 the entire contents of which are hereby incorporated by reference.

FIELD OF THE INVENTION

The present invention relates to an improvement in a saddle seat type vehicle having a canister.

DESCRIPTION OF BACKGROUND ART

A saddle seat type vehicle is known that includes a canister for temporarily storing fuel gas generated due to evaporation of fuel in a fuel tank. See, for example, FIG. 2 of Japanese Patent Laid-open No. 2010-229839 wherein a fuel tank (31) (the number or character in parentheses is the same as that shown in Japanese Patent Laid-open No. 2010-229839, and the same applies to the other numbers or characters) is provided in a floor tunnel portion (28), and an engine (E) is provided on the rear side of the fuel tank (31).

A canister (40) for temporarily adsorbing the fuel gas is provided between the fuel tank (31) and the floor tunnel portion (28), and a purge control valve (41) is provided on the rear side of the canister (40).

A charge pipe (48) for leading out the fuel gas extends from the fuel tank (31) to the canister (40). A first purge hose (51) extends from the canister (40) to the purge control valve (41). A second purge hose (52) extends from the purge control valve (41) to an intake pipe (54) of the engine (E).

According to the technique described in Japanese Patent Laid-open No. 2010-229839, the first purge hose (51) extends so as to be inclined downward toward the rear end of the vehicle, and the second purge hose (52) extends so as to be first inclined downward toward the rear end of the vehicle and next inclined upward until connected to the intake pipe (54) of the engine (E). In addition, the purge control valve (41) is inclined. Accordingly, liquefied fuel is apt to stay in the purge hose (52) and the purge control valve (41).

SUMMARY AND OBJECTS OF THE INVENTION

It is accordingly an object of the present invention to provide a technique which can suppress the stay of liquefied fuel in a purge pipe in a saddle seat type vehicle having a canister for adsorbing fuel gas.

According to an embodiment of the present invention, there is provided a saddle seat type vehicle including a body frame, a seat provided on the body frame wherein an operator may be seated with an engine being located below the seat An intake pipe is provided for supplying an air-fuel mixture to the engine with a pair of right and left steps provided on the body frame as footrests for the operator. A center tunnel is located between the right and left steps so as to be expanded upwardly in such a manner that a foot passage space for allowing the passage of the operator's foot in riding the vehicle is formed above the center tunnel. A fuel tank is located inside the center tunnel on the front side of the engine with a charge pipe extending from the fuel tank for leading out fuel gas in the fuel tank. A canister is connected to the charge pipe for temporarily adsorbing the fuel gas in the fuel tank with a purge pipe extending from the canister to the intake pipe for supplying the fuel gas to the intake pipe. A purge control valve is provided in the purge pipe for opening and closing a purge passage. The center tunnel is provided so that a lowermost point of the foot passage space is higher in level than a connection point where the purge pipe is connected to the intake pipe as viewed in a plan view of the vehicle. In addition, the center tunnel has an inclined portion inclined upwardly from the lowermost point toward the front end of the vehicle with the purge control valve being located at a position on the front side of the lowermost point and higher in level than the canister. The purge pipe is composed of a first purge pipe extending from the canister to the purge control valve and a second purge pipe extending from the purge control valve to the intake pipe with the second purge pipe being inclined downward toward the rear end of the vehicle.

According to an embodiment of the present invention, the purge control valve has an inlet to which the first purge pipe is connected and an outlet to which the second purge pipe is connected and the inlet and the outlet are aligned along a straight line, the straight line extending horizontally in a lateral direction of the vehicle.

According to an embodiment of the present invention, the fuel tank has an upper surface inclined downward toward the rear end of the vehicle, the purge control valve is mounted on the upper surface of the fuel tank and the canister is mounted on the upper surface of the fuel tank at a position on the rear side of the purge control valve.

According to an embodiment of the present invention, a fuel filler is provided on the upper surface of the fuel tank, the purge control valve is located on the front side of the fuel filler and the canister is located on the rear side of the fuel filler.

According to an embodiment of the present invention, the fuel tank is composed of an upper member having an upper flange and a lower member having a lower flange, the upper member and the lower member are connected together by joining the upper flange and the lower flange. The upper and lower flanges extend so as to be inclined downward toward the rear end of the vehicle. The upper member has an expanded portion expanded upwardly from the upper surface with the purge control valve being located in a recess formed between the expanded portion and the upper flange.

According to an embodiment of the present invention, the fuel filler is provided with a fuel tray superimposed on the canister as viewed in a plan view of the vehicle. The fuel tray has a down slope portion extending downwardly toward the front end of the vehicle so as to follow the external shape of the canister with a drain hole for draining fuel spilled in refueling being formed at the lower end of the down slope portion.

According to an embodiment of the present invention, the purge control valve is located at a position higher than that of the canister. Accordingly, the liquefied fuel in the purge control valve flows downward by gravitation, i.e., toward the canister, so that the liquefied fuel is hard to stay in the purge control valve located at a higher position. Further, the second purge pipe extending from the purge control valve to the intake pipe is inclined downwardly toward the rear end of the vehicle. Owing to this inclination of the second purge pipe, the liquefied fuel flows well in the second purge pipe. As a result, there is no possibility that the liquefied fuel may stay in the second purge pipe.

Furthermore, the purge control valve is located at a position higher than the lowermost point of the foot passage space. Accordingly, the foot passage space can be maintained at a low position.

According to an embodiment of the present invention, the inlet and the outlet of the purge control valve are aligned along a straight line. Since the inlet and the outlet are aligned along a straight line, the purge control valve can be easily provided in the purge pipe extending straight.

Furthermore, since the straight line connecting the inlet and the outlet extends horizontally in a lateral direction of the vehicle, the fuel is hard to stay in the purge control valve.

According to an embodiment of the present invention, both the canister and the purge control valve are mounted on the upper surface of the fuel tank. Accordingly, by preliminarily mounting the canister and the purge control valve to the fuel tank, the charge pipe for connecting the fuel tank and the canister and the first purge pipe for connecting the canister and the purge control valve can be subassembled with the fuel tank. As a result, the number of man-hours for assembly in a main line can be reduced and the flexibility on assembly can be improved.

Furthermore, since the canister is located on the upper surface of the fuel tank, the space above the upper surface of the fuel tank can be effectively used.

According to an embodiment of the present invention, the purge control valve and the canister are located on the front side and the rear side of the fuel filler of the fuel tank, respectively. The purge control valve and the canister are located in the space above the upper surface of the fuel tank, which upper surface is inclined downwardly toward the rear end of the vehicle. Accordingly, the space as a dead space on the front and rear sides of the fuel filler can be effectively used.

According to an embodiment of the present invention, the purge control valve is located in the recess formed on the fuel tank. Since the purge control valve is located in the recess as a dead space, the limited space can be effectively used.

According to an embodiment of the present invention, the fuel tray is superimposed on the canister as viewed in a plan view of the vehicle, and the fuel tray has the down slope portion extending downwardly toward the front end of the vehicle so as to follow the external shape of the canister. Since the fuel tray has this down slope portion, the fuel spilled on the fuel tray can be easily collected to the lower end of the down slope portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
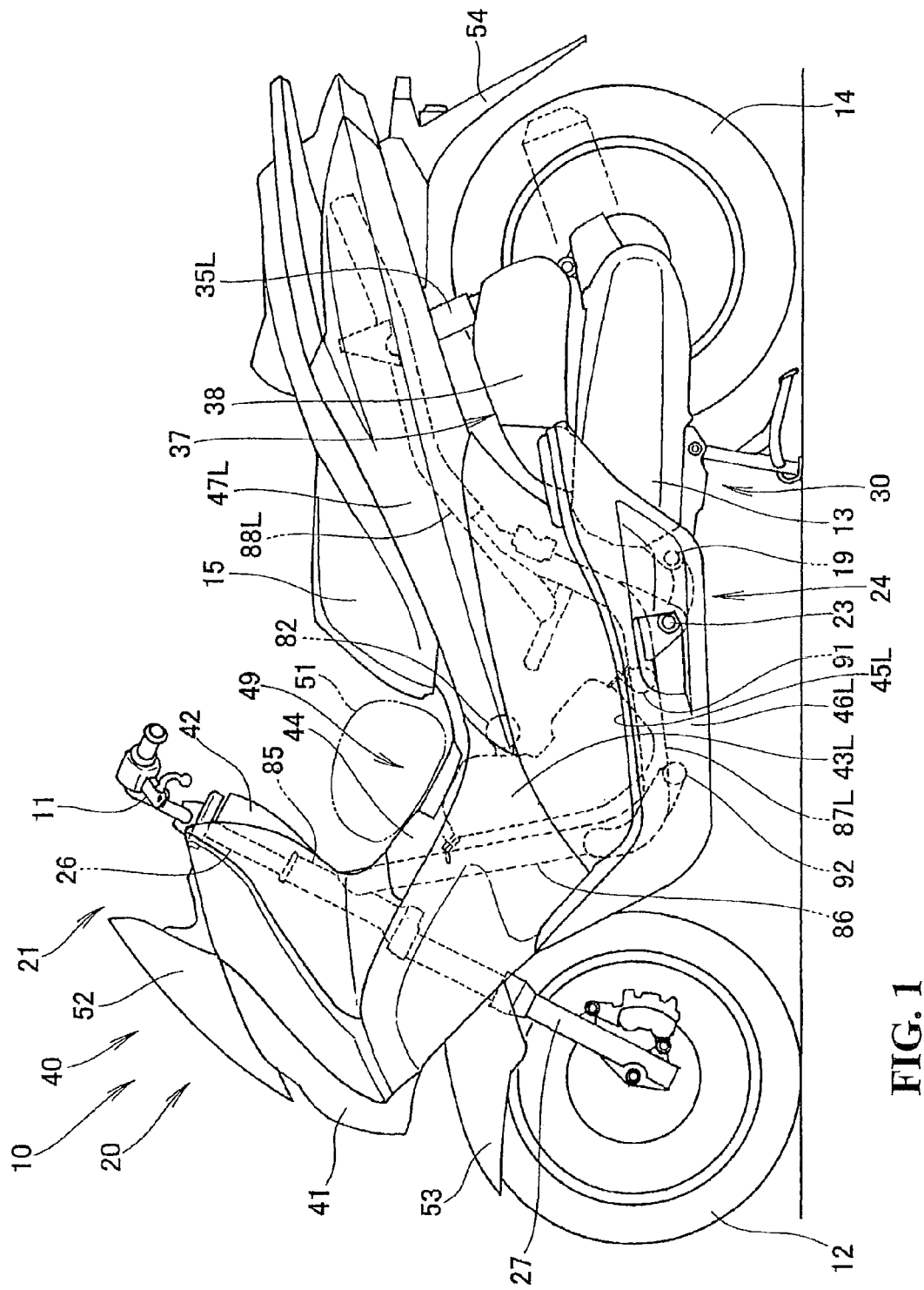
FIG. 1 is a left side view of a motorcycle according to the present invention.

A mode for carrying out the present invention will now be described in detail with reference to the drawings. The terms of "upper," "lower," "front," "rear," "right," and "left" used in the following description and the drawings mean the directions as viewed from an operator riding on a motorcycle. Further, the orientation of each drawing is the same as that of the reference numerals included therein.

A preferred embodiment of the present invention will now be described with reference to the drawings.

As shown in FIG. 1, a motorcycle 10 is provided as an example of the saddle seat type vehicle according to the present invention. The motorcycle 10 has a front wheel 12 provided at a front portion of the vehicle so as to be steerable by a steering system 21 including a steering handle 11, an engine 13 as a drive source provided on the rear side of the front wheel 12, a rear wheel 14 provided on the rear side of the engine 13 and adapted to be driven by the engine 13, and a seat 15 provided between the front wheel 12 and the rear wheel 14 and adapted to be straddled by the operator.

The motorcycle 10 includes a body frame 20, a link mechanism 24 extending rearwardly from the body frame 20 through a link pivot 23 as a shaft member, and a unit swing 30 mounted on the link mechanism 24, wherein the rear wheel 14 is supported to the rear end portion of the unit swing 30, and the unit swing 30 is pivotably supported to the body frame 20.

The body frame 20 includes mainly of a head pipe 85 provided at the front end for steerably supporting the steering system 21, a down frame 86 extending rearwardly from the head pipe 85 so as to be inclined downwardly toward the rear end of the vehicle, a pair of right and left lower frames 87R and 87L (only the left lower frame 87L is shown in FIG. 1) extending rearwardly from the lower portion of the down frame 86, and a pair of right and left seat frames 88R and 88L (only the left seat frame 88L is shown in FIG. 1) respectively extending rearwardly from the rear end portions of the right and left lower frames 87R and 87L so as to be inclined upwardly toward the rear end of the vehicle, wherein the seat 15 is supported to the right and left seat frames 88R and 88L.

A cross frame 91 laterally extends between the right and left lower frames 87R and 87L, and a front cross frame 92 laterally extends between the right and left lower frames 87R and 87L at a position on the front side of the cross frame 91. The lower end of the down frame 86 is connected to the front cross frame 92. Since the lower end of the down frame 86 is connected to the front cross frame 92, the front cross frame 92 can be reinforced by the down frame 86.

The unit swing 30 integrally includes the engine 13 for generating power. The unit swing 30 functions also as a swing arm. A pair of right and left shock absorbers 35R and 35L (only the left shock absorbers 35L is shown in FIG. 1) are interposed between the rear portion of the unit swing 30 and the body frame 20. The unit swing 30 is provided with an air cleaner 38 constituting an intake system 37.

The steering system 21 of the motorcycle 10 is composed of a steering shaft 26 rotatably provided at the front end portion of the body frame 20, a front fork 27 connected to the lower end of the steering shaft 26 for supporting the front wheel 12, and the steering handle 11 mounted to the upper end of the steering shaft 26.

The body frame 20 of the motorcycle 10 is covered with a body cover 40.

The body cover 40 includes a front cover 41 for covering the front side of the vehicle body, a center cowl 42 mounted to the front cover 41 from the rear side thereof for covering the upper portion of the steering system 21, a pair of right and left side covers 43R and 43L (only the left side cover 43L being shown in FIG. 1) extending rearwardly from the lower end portion of the front cover 41, a tunnel member 44 laterally extending between the right and left side covers 43R and 43L at a position on the front side of the seat 15 and continuing from the lower end portion of the center cowl 42, a pair of right and left under covers 46R and 46L (only the left under cover 46L is shown in FIG. 1) respectively provided below the right and left side covers 43R and 43L, the right and left under covers 46R and 46L respectively having a pair of right and left steps 45R and 45L (only the left step 45L being shown in FIG. 1) as footrests for the operator, and a pair of right and left rear side covers 47R and 47L (only the left rear side cover 47L is shown in FIG. 1) respectively extending rearwardly from the rear end portions of the right and left side covers 43R and 43L at a position on the lower side of the seat 15. All of these components of the body cover 40 are mounted on the body frame 20.

A center tunnel 49 is an upwardly expanded portion located on the front side of the seat 15 and formed by the right and left side covers 43R and 43L respectively extending upward from the right and left steps 45R and 45L as footrests for the operator with the tunnel member 44 laterally extending between the right and left side covers 43R and 43L. A foot passage space 51 for allowing easy passage of the operator's foot in riding the vehicle is formed above the center tunnel 49.

A windshield 52 extends from the upper end of the front cover 41. A front fender 53 is provided above the front wheel 12, and a rear fender 54 is provided to cover the upper and rear side of the rear wheel 14.

The structure below the center tunnel 49 and the seat 15 will now be described.

Figure 2:
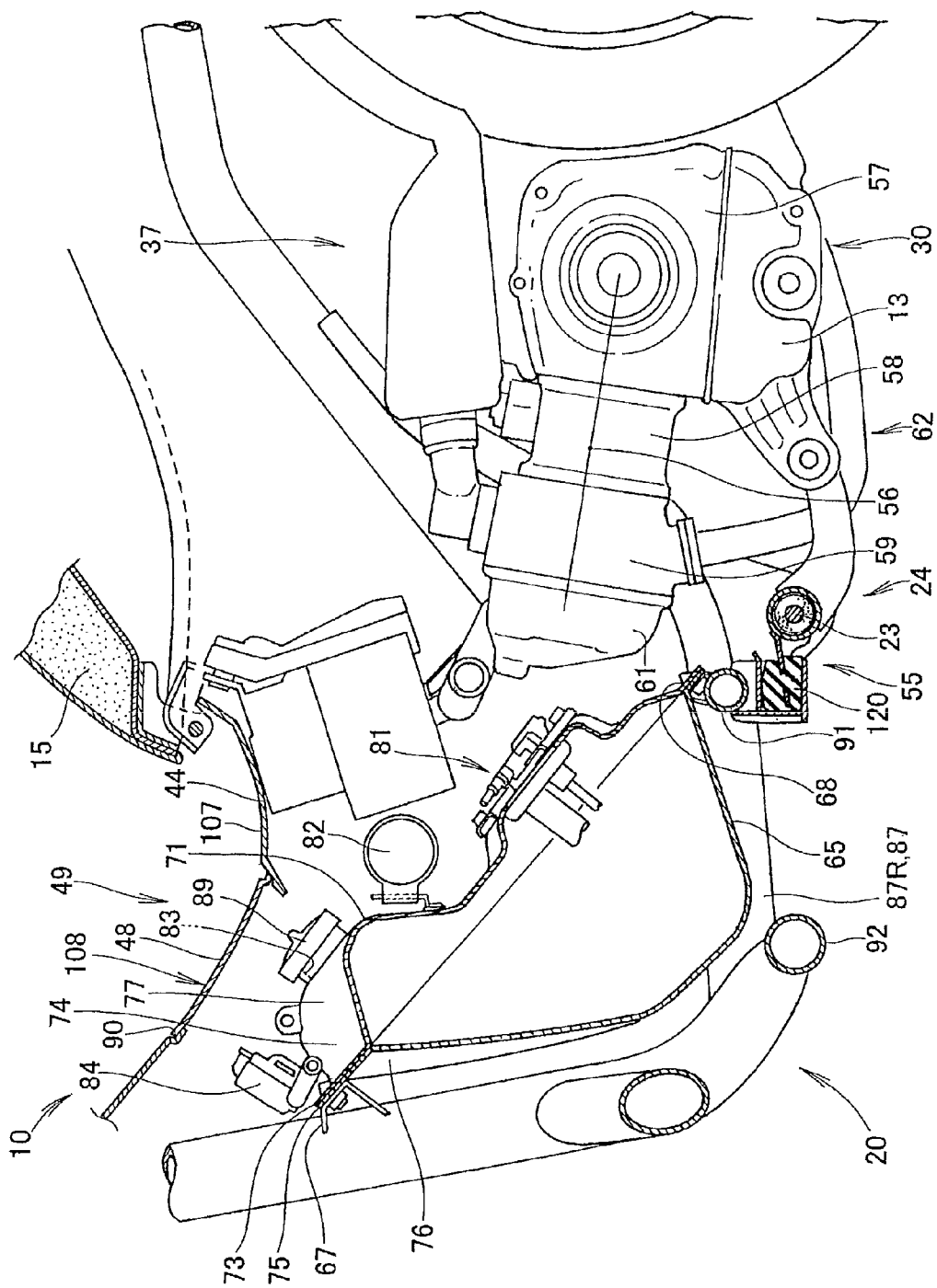
FIG. 2 is a sectional view of an essential part of the motorcycle shown in FIG. 1 (as viewed in side elevation)

As shown in FIG. 2, the link mechanism 24 is provided at the lower portion of the body frame 20, and the unit swing 30 having the engine 13 is pivotably supported to the link mechanism 24.

A link restricting portion 55 for restricting the amount of rotation of the link mechanism 24 is provided on the body frame 20 at a position on the front side of the link mechanism 24.

The engine 13 is arranged so that a cylinder axis 56 extends substantially horizontally in the longitudinal direction of the vehicle so as to be slightly inclined upwardly to the front end of the vehicle. The engine 13 has a crankcase 57, a cylinder block 58 mounted on the front end of the crankcase 57, a cylinder head 59 mounted on the front end of the cylinder block 58, and a head cover 61 mounted on the front end of the cylinder head 59. The intake system 37 is connected to the upper surface of the cylinder head 59, and an exhaust system 62 is connected to the lower surface of the cylinder head 59.

A fuel tank 65 is provided inside the center tunnel 49 on the front side of the engine 13. The fuel tank 65 is mounted to the body frame 20 through a first tank bracket 67 and a second tank bracket 68 provided on the rear side of the first tank bracket 67.

The fuel tank 65 has a substantially triangular shape as viewed in side elevation of the vehicle. The fuel tank 65 has an upper surface 71 inclined downwardly toward the rear end of the vehicle. The fuel tank 65 includes an upper member 74 having an upper flange 73 and a lower member 76 having a lower flange 75. The upper member 74 and the lower member 76 are connected together by joining the upper flange 73 and the lower flange 75. These upper and lower flanges 73 and 75 extend so as to be inclined downward toward the rear end of the vehicle. The upper member 74 has an expanded portion 77 expanded upwardly from the upper flange 73.

A fuel pump 81 for feeding fuel to the intake system 37 is mounted on the upper member 74 of the fuel tank 65. A canister 82 for temporarily adsorbing fuel gas generated due to evaporation of fuel in the fuel tank 65 is mounted on the upper member 74 of the fuel tank 65 at a position on the front side of the fuel pump 81. A fuel filler 83 is provided on the upper member 74 of the fuel tank 65 at a position on the front side of the canister 82, i.e., at the expanded portion 77 of the upper member 74. That is, the expanded portion 77 is formed on the front side of the canister 82. A purge control valve 84 is provided on the upper member 74 of the fuel tank 65 at a position on the front side of the expanded portion 77. The purge control valve 84 is mounted on the fuel tank 65. The purge control valve 84 is a member for controlling the supply of fuel gas stored in the canister 82 to the intake system 37 of the engine 13. A cap member 89 is removably provided on the fuel filler 83. The tunnel member 44 constituting the center tunnel 49 is formed with an opening 90 for refueling at a position above the fuel filler 83 and the cap member 89. This opening 90 is closed by a lid 48.

The upper surface 71 of the fuel tank 65 is inclined downwardly toward the rear end of the vehicle with the purge control valve 84 being mounted on the upper surface 71 of the fuel tank 65. Further, the canister 82 is also mounted on the upper surface 71 of the fuel tank 65 at a position on the rear side of the purge control valve 84.

Since the canister 82 is provided on the upper surface 71 as a component of the upper member 74 of the fuel tank 65, the space over the upper surface 71 of the fuel tank 65 can be effectively used.

Figure 3:
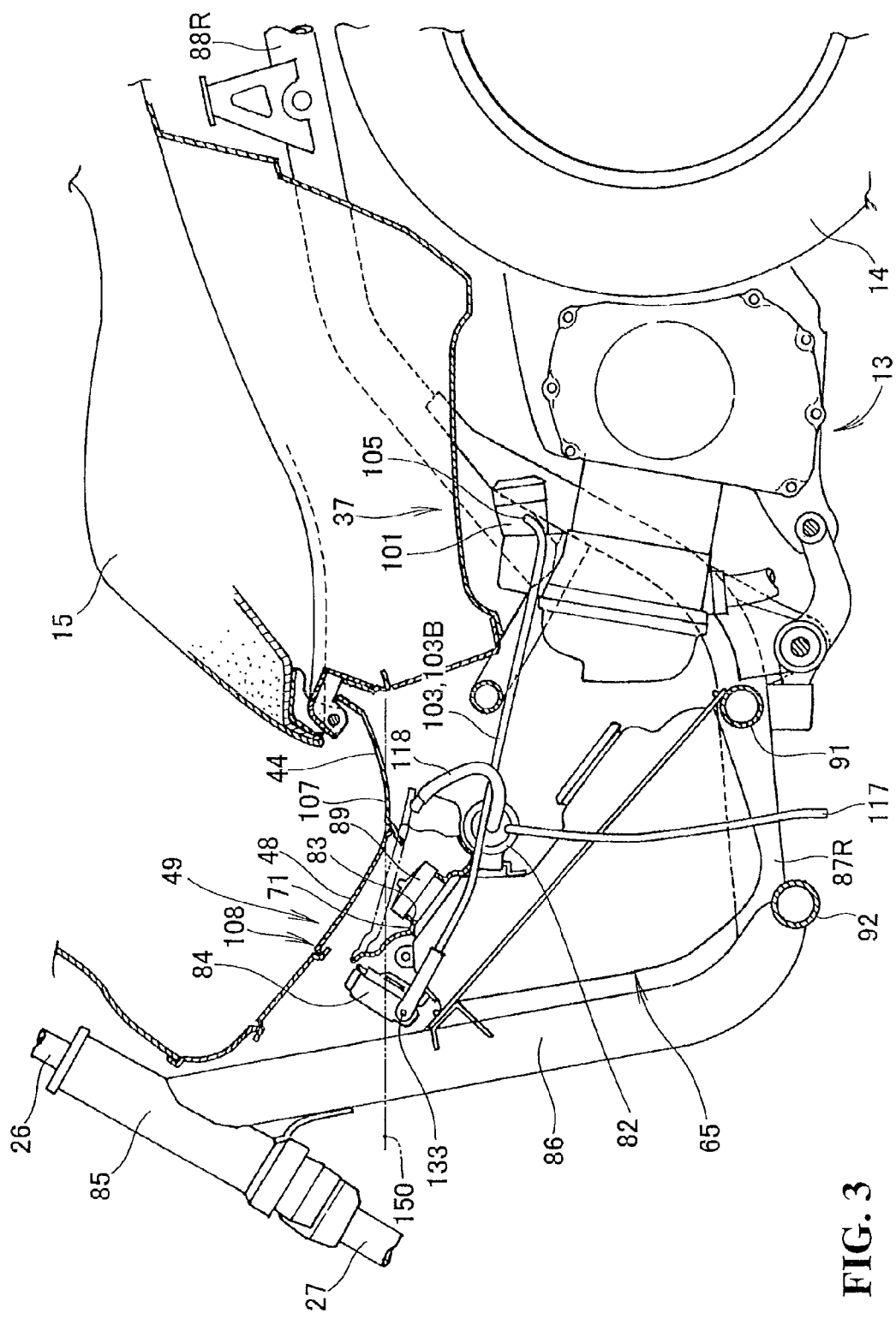
FIG. 3 is a left side view for illustrating the routing of a charge pipe and a purge pipe.

As shown in FIG. 3, the engine 13 is provided below the seat 15, and an intake pipe 101 as a component of the intake system 37 for supplying an air-fuel mixture is mounted on the engine 13.

The fuel tank 65 is provided inside the center tunnel 49 at a position on the front side of the engine 13.

Figure 4:
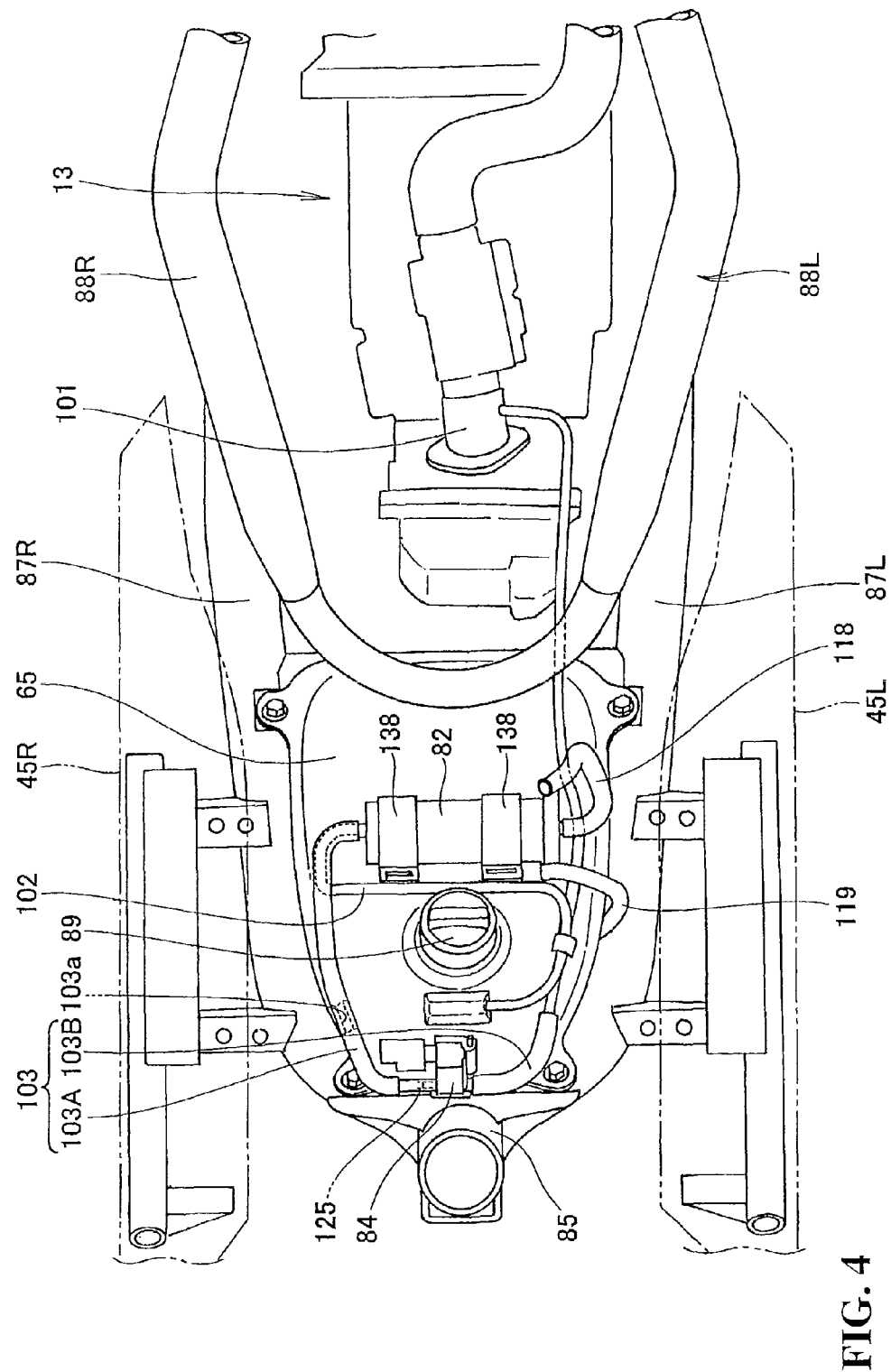
FIG. 4 is a plan view for illustrating the routing of the charge pipe and the purge pipe.

As shown in FIG. 4, there are provided on the front side of the engine 13 a charge pipe 102 extending from the fuel tank 65 for leading out the fuel gas in the fuel tank 65, the canister 82 connected to the charge pipe 102 for temporarily adsorbing the fuel gas in the fuel tank 65, a purge pipe 103 extending from the canister 82 to the intake pipe 101 for supplying the fuel gas to the intake pipe 101, and the purge control valve 84 provided in the purge pipe 103 for opening and closing a purge passage 103a.

Referring back to FIG. 3, the center tunnel 49 is provided so that a lowermost point 107 of the foot passage space 51 is higher in level than a connection point 105 where the purge pipe 103 is connected to the intake pipe 101. Further, the center tunnel 49 has an inclined portion 108 inclined upward from the lowermost point 107 toward the front end of the vehicle.

The purge control valve 84 is located on the front side of the fuel filler 83 provided on the upper surface 71 of the fuel tank 65 with the canister 82 being located on the rear side of the fuel filler 83.

The purge control valve 84 is located at a position on the front side of the lowermost point 107 and higher in level than the canister 82.

As shown in FIG. 4, the purge pipe 103 is composed of a first purge pipe 103A extending from the canister 82 to the purge control valve 84 and a second purge pipe 103B extending from the purge control valve 84 to the intake pipe 101. As shown in FIG. 3, the second purge pipe 103B is inclined downward toward the rear end of the vehicle.

The purge control valve 84 is provided on the front side of the fuel filler 83 of the fuel tank 65, and the canister 82 is provided on the rear side of the fuel filler 83 of the fuel tank 65.

The purge control valve 84 and the canister 82 are located in the space formed above the upper surface 71 inclined downwardly toward the rear end of the vehicle, so that the space on the front and rear sides of the fuel filler 83 as a dead space can be effectively used.

The purge control valve 84 is located on the front side of the foot passage space 51 (see FIG. 1) in such a manner that the upper portion of the purge control valve 84 projects upwardly from a horizontal line 150 passing through the lowermost point 107 of the foot passage space 51. Accordingly, the foot passage space 51 can be maintained at a low position.

The structure of the fuel filler 83 and its peripheral portion on the fuel tank 65 will now be described.

Figure 5:
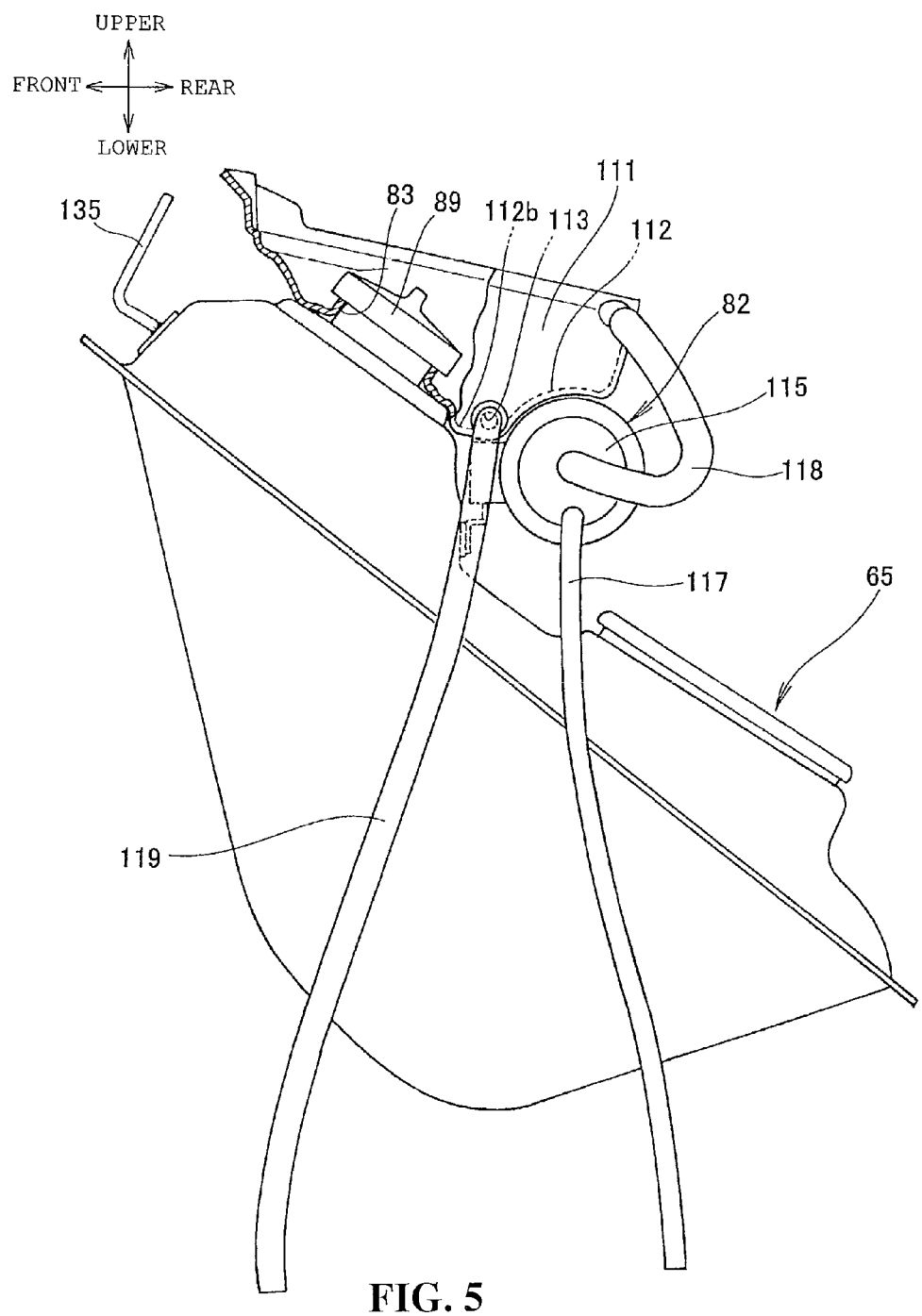
FIG. 5 is a sectional view for illustrating a fuel tray and its peripheral portion (as viewed in side elevation)

As shown in FIG. 5, the fuel filler 83 is provided with a fuel tray 111 superimposed on the canister 82 as viewed in plan of the vehicle. The fuel tray 111 has a down slope portion 112 extending downwardly toward the front end of the vehicle so as to follow the external shape of the canister 82. A drain hole 113 for draining fuel spilled in refueling is formed at the lower end 112b of the down slope portion 112. A drain pipe 119 for draining the fuel collected in the fuel tray 111 is connected to the drain hole 113 and extends downwardly.

The fuel tray 111 is superimposed on the canister 82 as viewed in plan of the vehicle and has the down slope portion 112 extending so as to follow the external shape of the canister 82. Since the fuel tray 111 has the down slope portion 112 extending so as to follow the external shape of the canister 82, the canister 82 can be arranged compactly and the fuel spilled on the fuel tray 111 can be easily collected to the lower end 112b of the down slope portion 112.

The canister 82 contains an adsorbing material capable of temporarily adsorbing the fuel gas in the fuel tank 65. Active carbon may be used as the adsorbing material. The canister 82 has a cylindrical shape, and a drain pipe 117 for draining excess fuel stored in the canister 82 is connected to the left side surface 115 of the canister 82. The drain pipe 117 extends downwardly. Further, an evaporative fuel pipe 118 for removing excess fuel gas stored in the canister 82 is connected at one end thereof to the left side surface 115 of the canister 82 at a position above the drain pipe 117. The other end of the evaporative fuel pipe 118 is connected to the fuel tray 111.

The pipes connected to the right side surface of the canister 82 will now be described.

As described above, the canister 82 contains the adsorbing material capable of temporarily adsorbing the fuel gas in the fuel tank 65.

Figure 6:
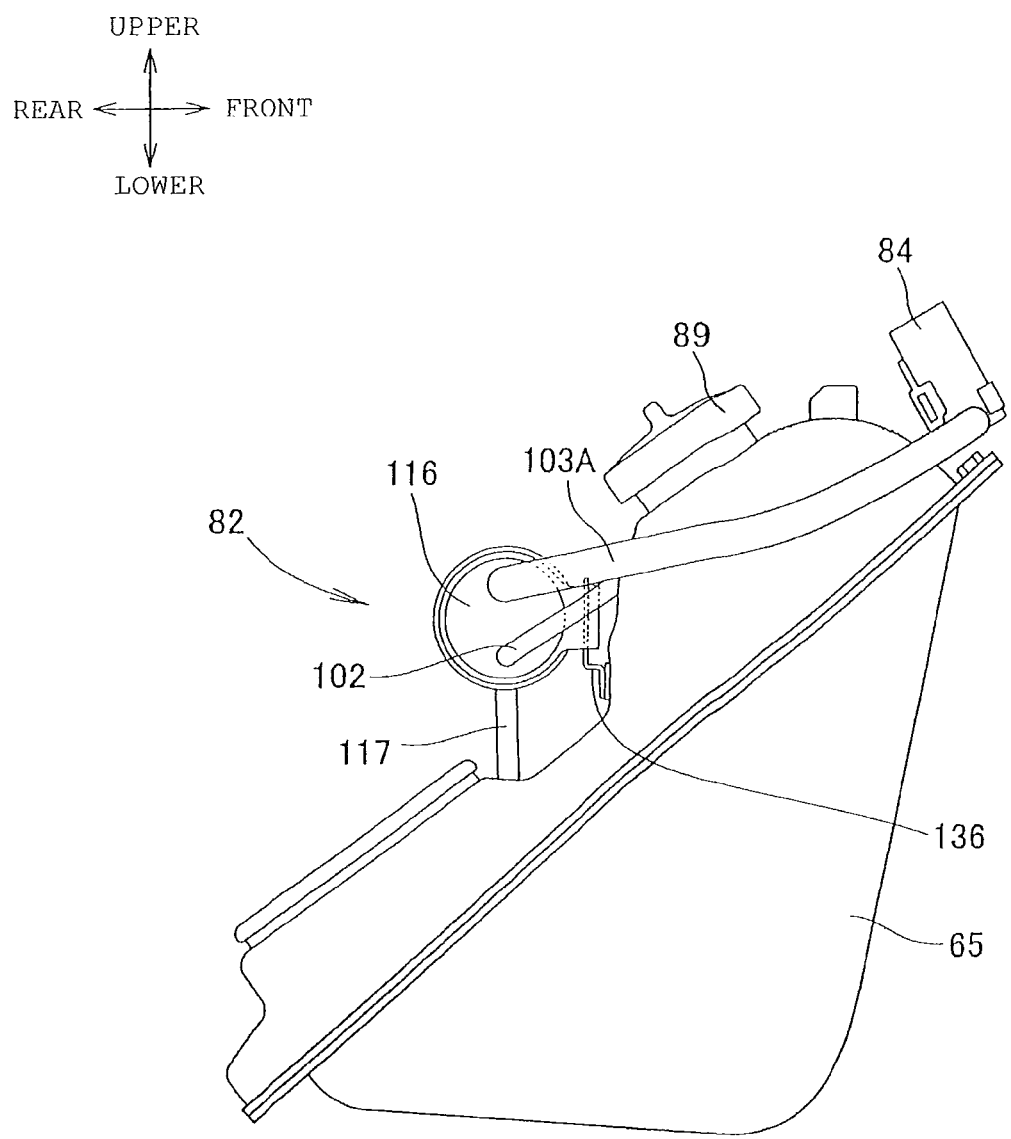
FIG. 6 is a right side view for illustrating the routing of the charge pipe and the purge pipe.

As shown in FIG. 6, one end of the charge pipe 102 extending from the fuel tank 65 is connected to the right side surface 116 of the canister 82. Further, the purge pipe 103 extending from the canister 82 to the intake pipe 101 for supplying the fuel gas to the intake pipe 101 is connected to the right side surface 116 of the canister 82 at a position above the charge pipe 102. More specifically, the first purge pipe 103A extending from the canister 82 to the purge control valve 84 is connected to the right side surface 116 of the canister 82.

The purge control valve 84 will now be described.

Figure 7A:
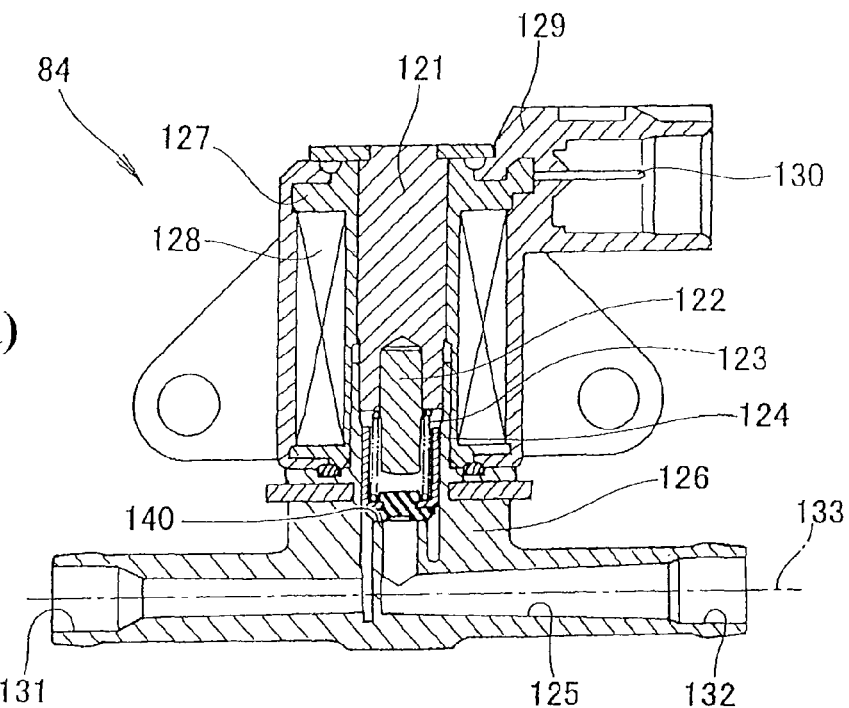
FIGS. 7(a) and 7(b) are sectional views for illustrating the structure and operation of a purge control valve.

As shown in FIG. 7(a), the purge control valve 84 is composed mainly of a core 121, a pin 122 provided at one end of the core 121 in its longitudinal direction, a spring 123 set on the pin 122, a plunger 124 engaged with the spring 123 in such a manner that the spring 123 is inserted in the plunger 124, a valve seat 126 having a fluid passage 125 and a seat surface 140 opposed to the lower end of the plunger 124 whereby the fluid passage 125 can be closed by the abutment of the plunger 124 against the seat surface 140. A bobbin 127 is provided around the core 121 with a coil 128 wound around the bobbin 127. A cover 129 is provided for covering the coil 128. In addition, a terminal 130 is provided as an electrode formed integrally with the cover 129 for supplying a current to the coil 128.

The fluid passage 125 formed in the valve seat 126 has an inlet 131 and an outlet 132. The first purge pipe 103A (see FIG. 4) is connected to the inlet 131, and the second purge pipe 103B (see FIG. 4) is connected to the outlet 132. The inlet 131 and the outlet 132 are aligned along a straight line 133. The first purge pipe 103A and the second purge pipe 103B constitute the purge pipe 103.

As mentioned above, the inlet 131 and the outlet 132 of the purge control valve 84 are aligned along the straight line 133. Accordingly, as compared with a purge control valve having an inlet and an outlet which are not aligned with each other, the purge control valve 84 having the inlet 131 and the outlet 132 aligned along the straight line 133 can be formed more easily.

Figure 7B:
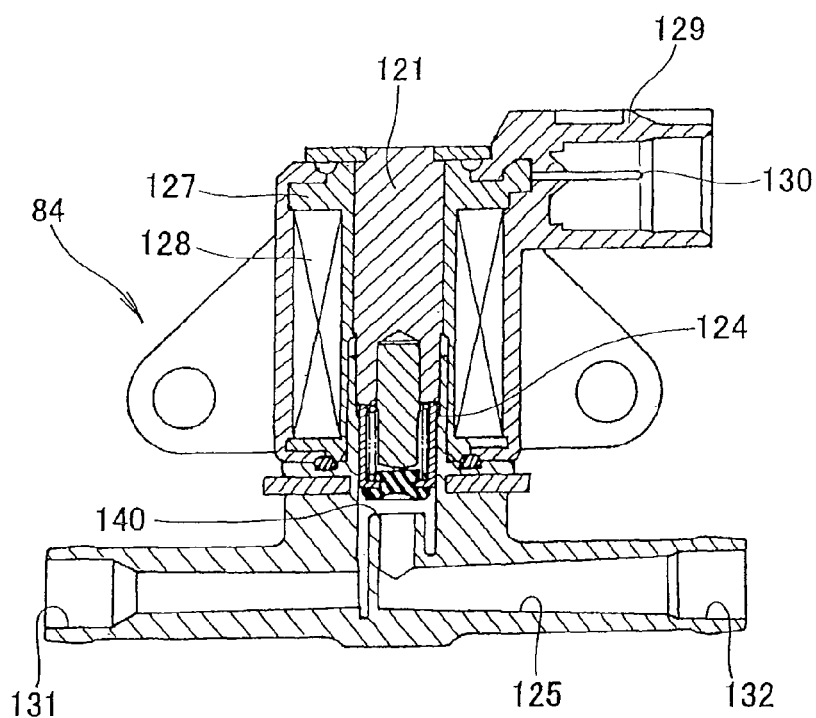

When the coil 128 is energized, the plunger 124 is moved upward as shown in FIG. 7(b). As a result, the fluid passage 125 normally closed by the abutment of the plunger 124 against the seat surface 140 of the valve seat 126 is opened.

When the coil 128 is deenergized, the plunger 124 abuts against the seat surface 140 of the valve seat 126 to close the fluid passage 125 as shown in FIG. 7(a).

Referring also to FIG. 3, the inlet 131 and the outlet 132 are aligned along the straight line 133, and the straight line 133 extends horizontally in the lateral direction of the vehicle. Since the straight line 133 connecting the center of the inlet 131 and the center of the outlet 132 extends horizontally in the lateral direction of the vehicle, the fuel is hard to stay in the purge control valve 84.

The mounting structure of the purge control valve 84 and the canister 82 to the fuel tank 65 will now be described.

Figure 8:
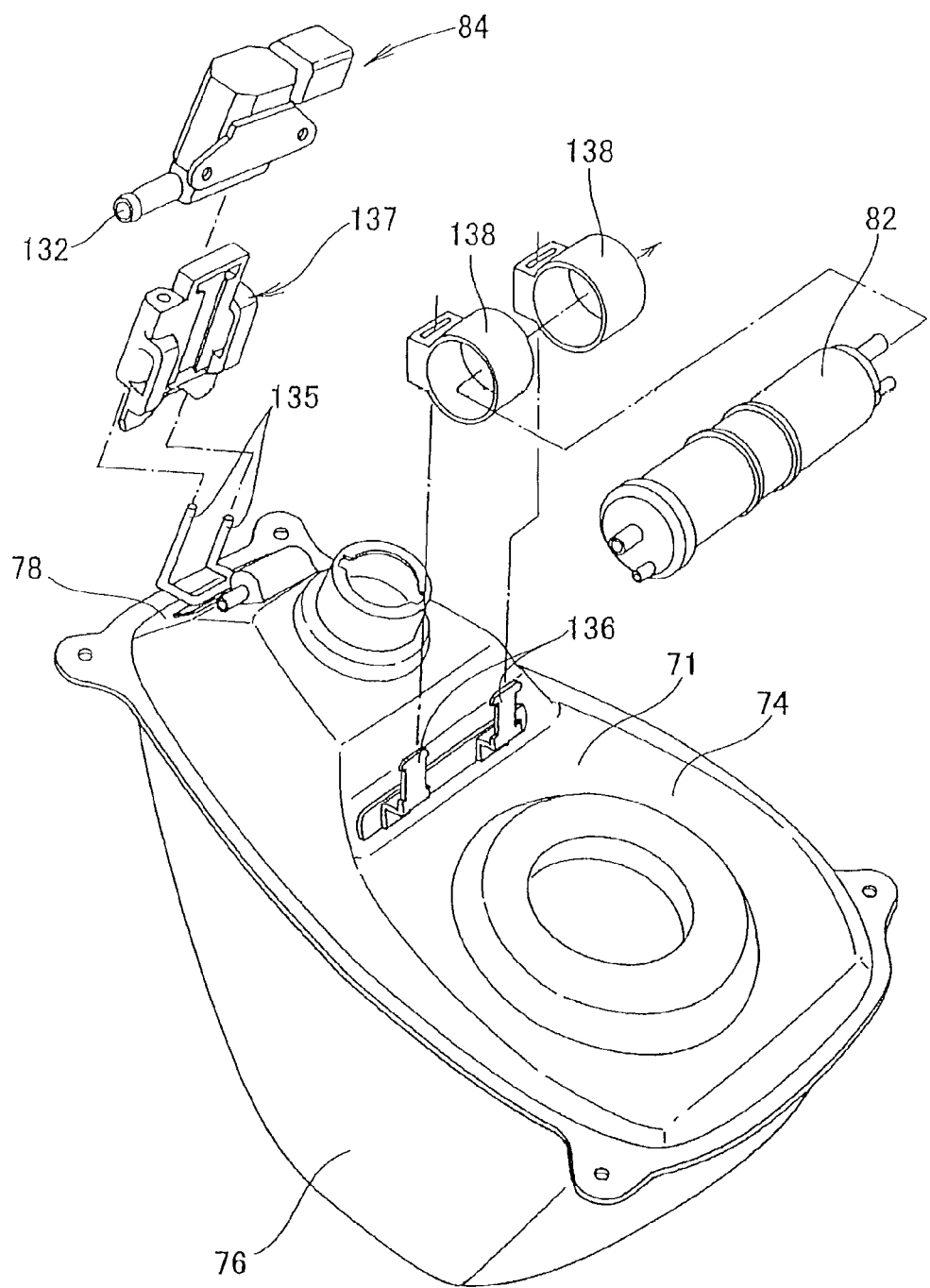
FIG. 8 is a perspective view for illustrating the procedure of mounting a canister and the purge control valve to a fuel tank.

As shown in FIG. 8, a first support stay 135 is provided on the upper surface 71 constituting the upper member 74 of the fuel tank 65 so as to project from the upper surface 71. The purge control valve 84 is detachably supported through a first holder 137 to the first support stay 135.

Similarly, a second support stay 136 is provided on the upper surface 71 of the fuel tank 65 so as to project from the upper surface 71. The canister 82 is detachably supported through a second holder 138 to the second support stay 136.

The purge control valve 84 is mounted to the fuel tank 65 in the following order. The purge control valve 84 is first held to the first holder 137. Thereafter, the first holder 137 holding the purge control valve 84 is mounted to the first support stay 135.

The canister 82 is mounted to the fuel tank 65 in the following order. The canister 82 is first held to the second holder 138. Thereafter, the second holder 138 holding the canister 82 is mounted to the second support stay 136.

In this manner, both the canister 82 and the purge control valve 84 are mounted on the upper surface 71 of the fuel tank 65. Accordingly, by preliminarily mounting the canister 82 and the purge control valve 84 to the fuel tank 65, the charge pipe 102 (see FIG. 4) for connecting the fuel tank 65 and the canister 82 and the first purge pipe 103A (see FIG. 4) for connecting the canister 82 and the purge control valve 84 can be sub-assembled with the fuel tank 65. As a result, the number of man-hours for assembly in a main line can be reduced and the flexibility on assembly can be improved.

The purge control valve 84 is located in a recess 78 formed on the fuel tank 65. Since the purge control valve 84 is located in the recess 78 as a dead space, the limited space below the center tunnel 49 (see FIG. 3) can be effectively used.

Further, the upper and lower flanges 73 and 75 of the fuel tank 65 extend so as to be inclined downwardly toward the rear end of the vehicle. Accordingly, the center tunnel 49 can be lowered in level to thereby improve the ease of passage of the operator's foot in riding the vehicle.

The operation of the motorcycle 10 described above will now be described.

Referring back to FIG. 3, the purge control valve 84 is located on the front side of the lowermost point 107 of the foot passage space at a position higher than that of the canister 82. Accordingly, the fuel liquefied is hard to stay in the purge control valve 84. In addition, the second purge pipe 103B extending from the purge control valve 84 to the intake pipe 101 is inclined downwardly toward the rear end of the vehicle. Accordingly, the fuel liquefied is hard to stay in the second purge pipe 103B, and the fuel gas can be easily supplied to the intake pipe 101.

While the saddle seat type vehicle according to the present invention is applied to a motorcycle in this preferred embodiment, the present invention is applicable also to a saddle seat type three-wheeled vehicle. Further, the present invention may be applied also to a general saddle seat type vehicle.

The present invention is preferably applied to a motorcycle having a canister for storing fuel gas.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle seat vehicle comprising a body frame, a seat provided on said body frame for use by an operator, an engine located below said seat, an intake pipe for supplying an air-fuel mixture to said engine, a right step and a left step provided on said body frame as footrests for said operator, a center tunnel located between said right step and the left step so as to be expanded upwardly wherein a foot passage space is provided for allowing the passage of the operator's foot in riding said vehicle is formed above said center tunnel, a fuel tank located inside said center tunnel on the front side of said engine, a charge pipe extending from said fuel tank for leading out fuel gas in said fuel tank, a canister connected to said charge pipe for temporarily adsorbing said fuel gas in said fuel tank, a purge pipe extending from said canister to said intake pipe for supplying said fuel gas to said intake pipe, and a purge control valve provided in said purge pipe for opening and closing a purge passage;

wherein said center tunnel is provided wherein a lowermost point of said foot passage space is higher in level relative to a connection point where said purge pipe is connected to said intake pipe as viewed in a plan view of said vehicle, and said center tunnel has an inclined portion inclined upwardly from said lowermost point toward the front end of said vehicle;

said purge control valve being located at a position on the front side of said lowermost point and higher in level than said canister; and said purge pipe is composed of a first purge pipe extending from said canister to said purge control valve and a second purge pipe extending from said purge control valve to said intake pipe, said second purge pipe being inclined downwardly toward the rear end of said vehicle.

2. The saddle seat vehicle according to claim 1, wherein said purge control valve has an inlet connected to said first purge pipe and an outlet connected to said second purge pipe; and said inlet and said outlet are aligned along a straight line, said straight line extending horizontally in a lateral direction of said vehicle.

3. The saddle seat vehicle according to claim 1, wherein said fuel tank has an upper surface inclined downwardly toward the rear end of said vehicle;

said purge control valve is mounted on said upper surface of said fuel tank; and said canister is mounted on said upper surface of said fuel tank at a position on the rear side of said purge control valve.

4. The saddle seat vehicle according to claim 2, wherein said fuel tank has an upper surface inclined downwardly toward the rear end of said vehicle;

said purge control valve is mounted on said upper surface of said fuel tank; and said canister is mounted on said upper surface of said fuel tank at a position on the rear side of said purge control valve.

5. The saddle seat vehicle according to claim 1, wherein a fuel filler is provided on said upper surface of said fuel tank;

said purge control valve is located on the front side of said fuel filler; and said canister is located on the rear side of said fuel filler.

6. The saddle seat vehicle according to claim 2, wherein a fuel filler is provided on said upper surface of said fuel tank;

said purge control valve is located on the front side of said fuel filler; and said canister is located on the rear side of said fuel filler.

7. The saddle seat vehicle according to claim 3, wherein a fuel filler is provided on said upper surface of said fuel tank;

said purge control valve is located on the front side of said fuel filler; and said canister is located on the rear side of said fuel filler.

8. The saddle seat vehicle according to claim 1, wherein said fuel tank includes an upper member having an upper flange and a lower member having a lower flange;

said upper member and said lower member are connected together by joining said upper flange and said lower flange;

said upper and lower flanges extend so as to be inclined downwardly toward the rear end of said vehicle;

said upper member has an expanded portion expanded upwardly from said upper flange; and said purge control valve is located in a recess formed between said expanded portion and said upper flange.

9. The saddle seat vehicle according to claim 2, wherein said fuel tank includes an upper member having an upper flange and a lower member having a lower flange;

said upper member and said lower member are connected together by joining said upper flange and said lower flange;

said upper and lower flanges extend so as to be inclined downwardly toward the rear end of said vehicle;

said upper member has an expanded portion expanded upwardly from said upper flange; and said purge control valve is located in a recess formed between said expanded portion and said upper flange.

10. The saddle seat vehicle according to claim 3, wherein said fuel tank includes an upper member having an upper flange and a lower member having a lower flange;

said upper member and said lower member are connected together by joining said upper flange and said lower flange;

said upper and lower flanges extend to be inclined downwardly toward the rear end of said vehicle;

said upper member has an expanded portion expanded upwardly from said upper flange; and said purge control valve is located in a recess formed between said expanded portion and said upper flange.

11. The saddle seat vehicle according to claim 4, wherein said fuel tank includes an upper member having an upper flange and a lower member having a lower flange;

said upper member and said lower member are connected together by joining said upper flange and said lower flange;

said upper and lower flanges extend to be inclined downwardly toward the rear end of said vehicle;

said upper member has an expanded portion expanded upwardly from said upper flange; and said purge control valve is located in a recess formed between said expanded portion and said upper flange.

12. The saddle seat vehicle according to claim 4, wherein a fuel filler is provided with a fuel tray superimposed on said canister as viewed in plan of said vehicle;

said fuel tray has a down slope portion extending downwardly toward the front end of said vehicle so as to follow the external shape of said canister; and a drain hole for draining fuel spilled in refueling is formed at the lower end of said down slope portion.

13. The saddle seat vehicle according to claim 5, wherein said fuel filler is provided with a fuel tray superimposed on said canister as viewed in plan of said vehicle;

said fuel tray has a down slope portion extending downwardly toward the front end of said vehicle so as to follow the external shape of said canister; and a drain hole for draining fuel spilled in refueling is formed at the lower end of said down slope portion.

14. A saddle seat vehicle including a canister for temporarily adsorbing fuel gas comprising:

a center tunnel located between a right step and a left step of the vehicle;

a fuel tank located inside said center tunnel on the front side of an engine, a charge pipe extending from said fuel tank for leading out fuel gas in said fuel tank;

said canister being connected to said charge pipe for temporarily adsorbing said fuel gas in said fuel tank;

a purge pipe extending from said canister to said intake pipe for supplying said fuel gas to said intake pipe;

a purge control valve provided in said purge pipe for opening and closing a purge passage; wherein said center tunnel includes an inclined portion inclined upwardly from a lowermost point toward a front end of said vehicle;

said purge control valve is located at a position on the front side of said lowermost point and higher in level relative to said canister;

said purge pipe is composed of a first purge pipe extending from said canister to said purge control valve and a second purge pipe extending from said purge control valve to said intake pipe, said second purge pipe being inclined downwardly toward the rear end of said vehicle; and said purge control valve has an inlet connected to said first purge pipe and an outlet connected to said second purge pipe and said inlet and said outlet are aligned along a straight line, said straight line extending horizontally in a lateral direction of said vehicle.

15. The saddle seat vehicle including a canister for temporarily adsorbing fuel gas according to claim 14, wherein said fuel tank has an upper surface inclined downwardly toward the rear end of said vehicle;

said purge control valve is mounted on said upper surface of said fuel tank; and said canister is mounted on said upper surface of said fuel tank at a position on the rear side of said purge control valve.

16. The saddle seat vehicle including a canister for temporarily adsorbing fuel gas according to claim 14, wherein a fuel filler is provided on said upper surface of said fuel tank;

said purge control valve is located on the front side of said fuel filler; and said canister is located on the rear side of said fuel filler.

17. The saddle seat vehicle including a canister for temporarily adsorbing fuel gas according to claim 14, wherein said fuel tank includes an upper member having an upper flange and a lower member having a lower flange;

said upper member and said lower member are connected together by joining said upper flange and said lower flange;

said upper and lower flanges extend to be inclined downwardly toward the rear end of said vehicle;

said upper member has an expanded portion expanded upwardly from said upper flange; and said purge control valve is located in a recess formed between said expanded portion and said upper flange.

18. A saddle seat vehicle including a canister for temporarily adsorbing fuel gas comprising:

a center tunnel located between a right step and a left step of the vehicle;

a fuel tank located inside said center tunnel on the front side of an engine, a charge pipe extending from said fuel tank for leading out fuel gas in said fuel tank;

said canister being connected to said charge pipe for temporarily adsorbing said fuel gas in said fuel tank;

a purge pipe extending from said canister to said intake pipe for supplying said fuel gas to said intake pipe;

a purge control valve provided in said purge pipe for opening and closing a purge passage; wherein said center tunnel includes an inclined portion inclined upwardly from a lowermost point toward a front end of said vehicle;

said purge control valve is located at a position on the front side of said lowermost point and higher in level relative to said canister;

said purge pipe is composed of a first purge pipe extending from said canister to said purge control valve and a second purge pipe extending from said purge control valve to said intake pipe, said second purge pipe being inclined downwardly toward the rear end of said vehicle;

wherein a fuel filler is provided on said upper surface of said fuel tank;

said purge control valve is located on the front side of said fuel filler; and said canister is located on the rear side of said fuel filler.

19. The saddle seat vehicle including a canister for temporarily adsorbing fuel gas according to claim 18, wherein said fuel tank has an upper surface inclined downwardly toward the rear end of said vehicle;
- said purge control valve is mounted on said upper surface of said fuel tank; and
- said canister is mounted on said upper surface of said fuel tank at a position on the rear side of said purge control valve.

20. The saddle seat vehicle including a canister for temporarily adsorbing fuel gas according to claim 18, wherein said fuel tank includes an upper member having an upper flange and a lower member having a lower flange;
- said upper member and said lower member are connected together by joining said upper flange and said lower flange;
- said upper and lower flanges extend to be inclined downwardly toward the rear end of said vehicle;
- said upper member has an expanded portion expanded upwardly from said upper flange; and
- said purge control valve is located in a recess formed between said expanded portion and said upper flange.

\* \* \* \* \*